No. 796,444. PATENTED AUG. 8, 1905.
J. H. K. McCOLLUM.
FLUID TURBINE.
APPLICATION FILED FEB. 20, 1905.

Witnesses. Inventor.
J. H. K. McCollum

UNITED STATES PATENT OFFICE.

JAMES HARRY KEIGHLY McCOLLUM, OF TORONTO, CANADA, ASSIGNOR OF ONE-HALF TO JOHN WYCLIFFE LOWES FORSTER, OF TORONTO, CANADA.

FLUID-TURBINE.

No. 796,444.      Specification of Letters Patent.      Patented Aug. 8, 1905.

Application filed February 20, 1905. Serial No. 246,568.

*To all whom it may concern:*

Be it known that I, JAMES HARRY KEIGHLY McCOLLUM, of the city of Toronto, in the county of York, in the Province of Ontario, Canada, have invented certain new and useful Improvements in Fluid-Turbine Engines, of which the following is a specification.

My invention relates to improvements in fluid-turbine engines; and the object of the invention is to devise a cheap, efficient, strong, light, compact, and durable engine which will have a maximum starting torque at any speed within its range and which may be run economically at a slow speed, which may be more readily reversed than an ordinary steam-engine, which will have a minimum condensing-surface, and in which vibration will be minimized; and it consists, essentially, of a drum secured on a suitable shaft and provided with one or more circumferentially-arranged serpentine passage-ways, a casing for the drum provided with bearings for the shaft, a diverging nozzle or nozzles extending through the casing and designed to direct the steam into the serpentine passage-ways, the said casing being provided with a suitable exhaust and the parts being otherwise arranged and constructed in detail, as hereinafter more particularly explained.

Figures 1, 2:
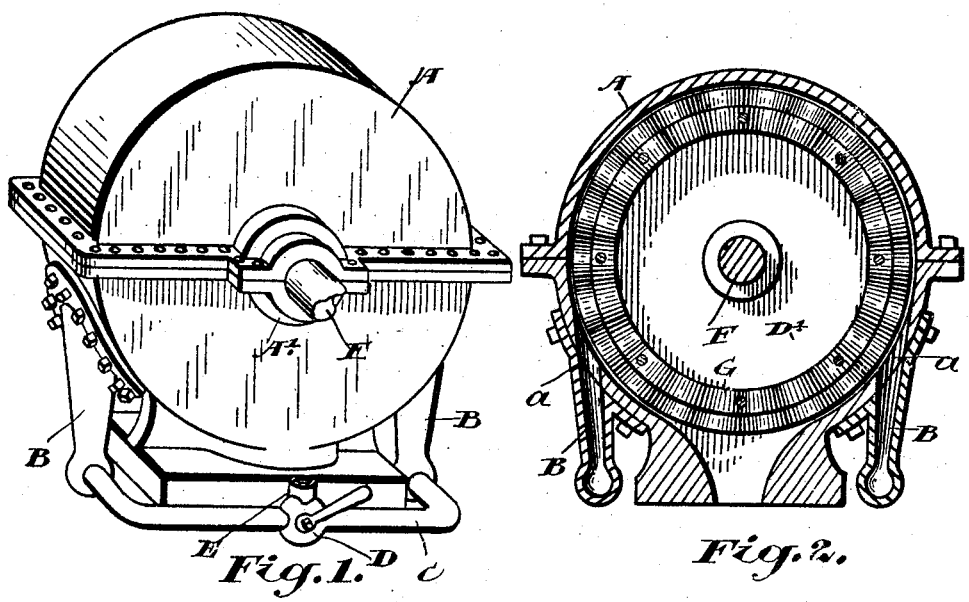
Figures 3, 4:
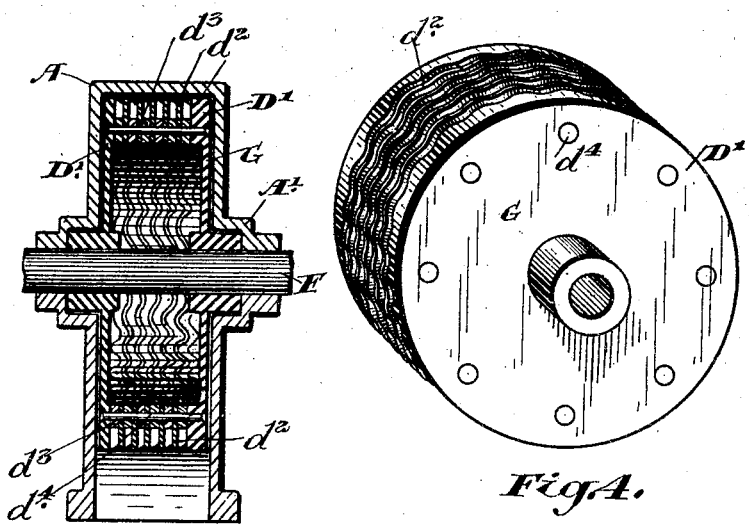

Figure 1 is a perspective view of the outside of my improved turbine, showing the location of the diverging nozzles and the steam-pipes. Fig. 2 is a cross-section. Fig. 3 is an axial section. Fig. 4 is an enlarged detail of the drum.

In the drawings like letters of reference indicate corresponding parts in each figure.

A is the casing of the turbine; B, the diverging nozzles, which are secured to the casing opposite the orifices $a$.

C is the branch steam-pipe, leading to the diverging nozzles B B, and D is a two-way valve, which is located at the point of juncture between the main steam-pipe E and the branch steam-pipe C. The object of the two-way valve is to direct the steam to either diverging nozzle B, depending on which direction it is desired to run the engine.

The casing may be made in two portions, as indicated in Fig. 1, or in any other suitable manner. In any case it is provided with suitable bearings A', having stuffing-boxes of any suitable construction, through which the main shaft F extends.

G is a drum secured on the main shaft, comprising the end disks D' D', provided with suitable hubs $d'$ $d'$, by which they are secured to the shaft. Between the end disks D' D' are located the corrugated annular plates $d^2$, separated by the corrugated rings $d^3$ of a smaller diameter exteriorly. The rings $d^2$ and $d^3$ and end plates D' are connected together by suitable bolts or rods $d^4$. The projecting portions of the corrugated rings $d^2$ are necessarily of a wavy form, and thus constitute serpentine passage-ways around the periphery of the drum between the end plates D' D'. It will be noticed that the end plates D' D' of the drum are located at a slight distance from the casing, thereby forming an annular space which would fill with steam, or any suitable form of centrifugal packing may be provided within the space near the periphery; but I do not describe such centrifugal packing, as there are several forms which may be suitable for the purpose.

It is essential in connection with my invention that the nozzles used where the engine is used as a steam-engine be diverging nozzles; but it will of course be understood that where other fluids are used, such as water, the nozzles would more properly be converging nozzles; but the form of nozzles may be readily varied without departing from the spirit of my invention.

In such a turbine-engine as I have described it will be seen that the steam will have attained its full velocity at the inner end of the diverging nozzles, and consequently when the steam passes into the serpentine passage-ways such serpentine passage-ways will receive the steam at its full speed and absorb the velocity of the steam as it passes through the passage-ways to the exhaust. Again, it will be quite readily understood that the position of the exhaust relatively to the nozzle may be varied according to the diameter of the drum or the length of arc of the passage-way at which the steam shall have parted with its velocity.

It will now be seen that my engine will be of great efficiency at various speeds, but that it is essentially a slow-speed turbine and does not need to be run at a high rate of speed to attain its maximum efficiency, as in the ordinary turbine.

What I claim as my invention is—

1. In a fluid-turbine, the combination with a casing, nozzle and exhaust, of a rotative drum having serpentine circumferential passage-ways in its peripheral face provided with continuous imperforate unbroken walls as specified.

2. In a fluid-turbine, a rotative drum having serpentine circumferential passage-ways in its peripheral face provided with continuous imperforate unbroken walls as specified.

3. In a fluid-turbine, the combination with a rotative drum having serpentine circumferential passage-ways in its peripheral face provided with continuous imperforate unbroken walls, of the casing and a diverging nozzle extending through the same and designed to extend over a plurality of passage-ways, so that the steam is fully expanded prior to the entrance into the passage-ways as specified.

4. In a fluid-turbine, a rotative drum having serpentine circumferential passage-ways in its peripheral face provided with continuous imperforate unbroken walls so arranged that the alternate curves of the passage-ways will turn the steam from its natural straight or direct course around the wheel as and for the purpose specified.

JAMES HARRY KEIGHLY McCOLLUM.

Witnesses:
B. BOYD,
A. S. BAK.